(12) United States Patent
Favre et al.

(10) Patent No.: US 9,161,553 B2
(45) Date of Patent: Oct. 20, 2015

(54) PROCESSING OF VEGETABLE OILS

(75) Inventors: Thomas Louis François Favre, Wormerveer (NL); Krishnadath Bhaggan, Wormerveer (NL)

(73) Assignee: Loders Croklaan B.V., AZ Wormerveer (NL)

( * ) Notice: Subject to any disclaimer, the term of this patent is extended or adjusted under 35 U.S.C. 154(b) by 114 days.

(21) Appl. No.: 13/807,205

(22) PCT Filed: Jun. 28, 2011

(86) PCT No.: PCT/EP2011/060858
§ 371 (c)(1),
(2), (4) Date: Feb. 26, 2013

(87) PCT Pub. No.: WO2012/001015
PCT Pub. Date: Jan. 5, 2012

(65) Prior Publication Data
US 2013/0149414 A1    Jun. 13, 2013

(30) Foreign Application Priority Data
Jun. 30, 2010 (EP) ..................................... 10251193

(51) Int. Cl.
| A23L 1/23 | (2006.01) |
| A23L 1/22 | (2006.01) |
| A23L 1/277 | (2006.01) |
| A23B 7/16 | (2006.01) |
| C07C 51/43 | (2006.01) |
| C11B 3/00 | (2006.01) |
| C11B 7/00 | (2006.01) |
| C11B 13/00 | (2006.01) |

(Continued)

(52) U.S. Cl.
CPC ........ *A23D 9/04* (2013.01); *A23D 7/001* (2013.01); *C11B 3/10* (2013.01); *C11C 3/10* (2013.01)

(58) Field of Classification Search
CPC ............. C11B 3/10; A23D 7/001; A23D 9/04
USPC ...................... 426/33, 254, 257, 253; 554/191
See application file for complete search history.

(56) References Cited

U.S. PATENT DOCUMENTS

| 5,917,069 A | 6/1999 | Buckl et al. |
| 6,027,755 A | 2/2000 | Henderson et al. |

(Continued)

FOREIGN PATENT DOCUMENTS

| EP | 1 639 120 B1 | 5/2007 |
| JP | 2-203790 | 8/1990 |

(Continued)

OTHER PUBLICATIONS

"B80 Natural". Available online at www.ataendustriyel.com.tr on Apr. 7, 2009.*

(Continued)

*Primary Examiner* — Rena L Dye
*Assistant Examiner* — Assaf Zilbering
(74) *Attorney, Agent, or Firm* — Hamilton, Brook, Smith & Reynolds, P.C.

(57) ABSTRACT

A process for interesterifying a vegetable oil comprises treating the vegetable oil by contacting the vegetable oil with a natural adsorbent to give a pH in the range of from 6 to 8, separating the oil from the adsorbent and reacting the treated oil in the presence of an enzymatic catalyst for interesterification.

14 Claims, 1 Drawing Sheet

(51) Int. Cl.
*A23D 9/04* (2006.01)
*A23D 7/00* (2006.01)
*C11B 3/10* (2006.01)
*C11C 3/10* (2006.01)

(56) References Cited

U.S. PATENT DOCUMENTS

| | | | |
|---|---|---|---|
| 6,288,003 | B1 | 9/2001 | Fabry et al. |
| 6,346,286 | B1 | 2/2002 | Council et al. |
| 7,452,702 | B2 | 11/2008 | Lee |
| 2005/0014237 | A1 | 1/2005 | Lee |
| 2010/0190220 | A1 | 7/2010 | Furihata et al. |

FOREIGN PATENT DOCUMENTS

| | | |
|---|---|---|
| JP | 6-1996 | 1/1994 |
| JP | 10-508497 | 8/1998 |
| JP | 2007-528732 | 10/2007 |
| JP | 2008-22744 | 2/2008 |
| WO | WO 96/10643 A1 | 4/1996 |
| WO | WO 96/14756 | 5/1996 |
| WO | WO 96/19115 | 6/1996 |
| WO | WO 2005/071053 A1 | 8/2005 |
| WO | WO 2005/087918 A2 | 9/2005 |
| WO | WO 2009/017102 A1 | 2/2009 |

OTHER PUBLICATIONS

De Greyt et al., "Developments in Hydrogenation and Interesterification to Comply with New Nutritinoal and Health Standards for Edible Oils". Available online at www.soci.org on Apr. 16, 2008.*

"Moving Beyond Colour" Available online at 222.alfalaval.com on Sep. 10, 2009.*

Aini et al., "Utilization of Palm Oil and Palm Products in Shortenings and Margarines". Eur. J. Lipid Sci. Technol. 109(2007) pp. 422-432.*

"Eiko Exports". Available online at www.eikoexports.com on Feb. 1, 2001.*

Paige Richardson "Effects of Bleaching Processes on Oil Properties of Safflower and Canola Oil for Culinary Applications". Available online at mysare.sare.org on Apr. 18, 2014.*

Gunstone, F.D., et al., The Lipid Handbook, CRC Press, $3^{rd}$ Ed., pp. 212-213 (2007).

Notification Concerning Transmittal of International Preliminary Report on Patentability, International Application No. PCT/EP2011/060858, Dated: Jan. 17, 2013.

International Search Report of Application No. PCT/EP2011/060858, filed Jun. 28, 2011, dated Oct. 18, 2011, consisting of 4 pages.

Ahmad, A., et al., "Residual Oil and Suspended Solid Removal Using Natural Adsorbents Chitosan, Bentonite and Activated Carbon: A Comparative Study," *Chemical Engineering Journal,* Elsevier Sequoia, Lausanne, CH, vol. 108, No. 1-2, pp. 179-185 (2005).

Maskan, M., et al., "Effect of Different Adsorbents on Purification of Used Sunflower Seed Oil Utilized for Frying," *European Food Research and Technology,* vol. 217, No. 3, pp. 215-218, Database FSTA [Online], International food Information Service (IFIS), Frankfurt-Main, DE (2003).

English Translation of "Industrial Production of Edible Vegetable Oil and Pollution Control, Editor: Bureau of Township Enterprises, Ministry of Agriculture, PRC, China Environmental Science Press, Oct., 1991 ($1^{st}$ Ed.), p. 87-90," pp. 1-3.

* cited by examiner

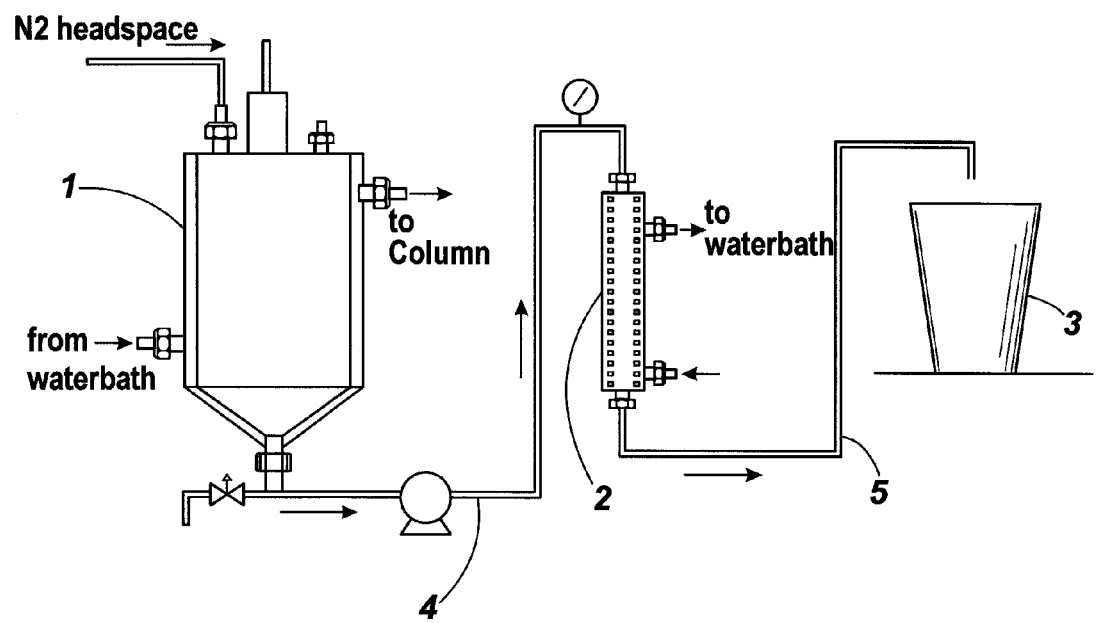

PROCESSING OF VEGETABLE OILS

This application is the U.S. National Stage of International Application No. PCT/EP2011/060858, filed Jun. 28, 2011, which designates the U.S., published in English, and claims priority under 35 U.S.C. §§119 or 365(c) to European Application No. 10251193.8, filed Jun. 30, 2010.

This invention relates to the treatment and processing of vegetable oils.

Vegetable oils are valuable commercial products that are used, for example, in the food industry. The oils can be used as such or modified before use. Modification is sometimes necessary or desirable in order to make the vegetable oil more suitable for use in a given application. For example, vegetable oils are typically liquid at room temperature and are generally too low melting to be used as hardstock fats for margarines and spreads. Consequently, vegetable oils for use as hardstocks have been treated to increase their solid fat content at room temperature.

Processes for modifying vegetable oils on an industrial scale have traditionally involved chemical reactions such as hydrogenation in the presence of a metal catalyst or interesterification in the presence of a metal salt. Hydrogenation increases the level of saturated fatty acids in the oil and so raises the solid fat content at a given temperature. The randomisation of fatty acid residues on the triglycerides that takes place during interesterification also increases the solid fat content.

More recently, it has become possible to carry out interesterification in the presence of an enzyme. The advantages of enzymatic processes include the mild conditions that can be employed and the potential to omit added metals or metal salts from the process. Examples of disclosures of using enzymatic interesterification in the production of hardstocks for margarines and spreads can be found in WO 2005/071053 and WO 96/19115.

Enzymatic interesterification requires a high efficiency for the process in order to make it commercially viable. One approach to improving efficiency has been to try to increase the life of the enzyme.

U.S. Pat. No. 7,452,702 describes a method for producing fats or oils by deodorization alone or deodorization and purification of the initial substrate, to improve the productivity of enzymatic interesterification. This patent lists a variety of possible oils and methods of deodorization and purification.

U.S. Pat. No. 6,027,755 relates to bleaching clays that can be used to purify edible or inedible oils. The bleaching agents are formed by the agglomeration of acid-activated clay particles.

There remains a need to improve the pretreatment of vegetable oils prior to enzymatic reaction. In particular, it has been found that the productivity of the enzyme remains low for commercial application on an industrial scale.

We have found that the type of bleaching earth that is used for pretreating the oil greatly affects the productivity of the enzymatic reaction.

According to the present invention, there is provided a method of treating a vegetable oil, which comprises: contacting the vegetable oil with a natural adsorbent to give a pH in the range of from 6 to 8; and separating the oil from the adsorbent.

In another aspect, the invention provides a process for interesterifying a vegetable oil, which comprises treating the vegetable oil according to the method of the invention and reacting the treated vegetable oil in the presence of an enzymatic catalyst for interesterification.

A further aspect of the invention is a method of increasing the productivity of an enzyme in a process for the interesterification of a vegetable oil, which comprises treating the oil with a natural adsorbent to give a pH in the range of from 6 to 8.

Also provided by the invention is a method of producing a hardstock for a margarine, which comprises interesterifying a vegetable oil according to the process of the invention.

The invention also contemplates a method of treating a vegetable oil, which comprises: contacting the vegetable oil with a natural adsorbent in the presence of water; and separating the oil from the adsorbent.

Further contemplated by the invention is a method of treating a vegetable oil, which comprises: contacting the vegetable oil with a natural adsorbent in the presence of water; and separating the oil from the adsorbent, wherein the resulting oil comprises less than 1% by weight of soaps.

Vegetable oils that are useful in the invention are typically oils that comprise as the major component (i.e., greater than 50% by weight, generally greater than 75% or greater than 90% by weight) glycerides of fatty acids. The term "oils" includes both oils and fats. The glycerides are mostly triglycerides (i.e., more than 90% by weight of the glycerides are typically triglycerides) but they may include some mono- and di-glycerides. The term "fatty acids" as used herein refers to C12 to C24 saturated or unsaturated (including mono- and poly-unsaturated) straight chain carboxylic acids.

Vegetable oils that may be used in the invention include palm oil, palm kernel oil, palm olein, palm stearin, palm kernel olein, palm kernel stearin, cocoa butter, cocoa butter substitutes, illipe fat, shea fat, canola oil, castor oil, coconut oil, coriander oil, corn oil, cottonseed oil, hazelnut oil, hempseed oil, linseed oil, mango kernel oil, olive oil, peanut oil, rapeseed oil, rice bran oil, safflower oil, soybean oil, and sunflower oil. The oils may be used singly or as a mixture of one or more different types of oil.

Preferred vegetable oils are from palm. Preferably, the oil comprises one or more oils derived from palm. Oils derived from palm include palm oil, palm oil stearin, palm olein, palm kernel oil, palm kernel stearin and palm kernel olein. More preferably, the oil comprises a mixture (i.e, a blend) of palm oil stearin and palm kernel oil.

Blends of palm oils (such as palm oil stearin and palm kernel oil) are preferably formed at a temperature of 70 to 100° C., such as 80 to 90° C.

In the invention, the oil is contacted with a natural adsorbent. Contacting the oil with the adsorbent may be carried out in ways that are well known to those skilled in the art. For example, the adsorbent may be added to the oil, or vice versa, or the oil may be passed over or through the adsorbent (for example in a column).

Surprisingly, it has been found that natural adsorbents are superior to other absorbents for the treatment of the oil. In particular, natural adsorbents are unexpectedly better at extending the life of the enzyme in an interesterification reaction using the treated oil. Without wishing to be bound by theory, it is believed that the natural adsorbents provide the optimum removal of contaminants that are detrimental to the enzyme as well as causing the appropriate adjustment of the pH without excessive soap formation.

Natural adsorbents are generally minerals occurring in nature that have not been chemically modified or treated, for example by activation with acid or alkali. The natural absorbent may, for example, be a clay.

Preferred natural adsorbents are clays that have an intergrowth of two or more materials. More preferably, the natural adsorbents are based on an intergrowth of hormite and smectite minerals.

Smectite clays include clays such as montmorillonite and bentonite. They have a layered or plate-like structure and are characterized by substitutions of metal ions within their structure, and are therefore electrically unbalanced. Hormite or attapulgite is a magnesium aluminium silicate clay of very fine particle size with a chain instead of a sheet structure.

Natural adsorbents that comprise an intergrowth of hormite and smectite minerals may be intermediate in structure between that of bentonite and attapulgite, with lamellae and tubules forming a three dimensional, porous network.

The natural adsorbent is preferably contacted with the oil in an amount of from 0.05 to 5.0% by weight of the oil. More preferably, the adsorbent is contacted with the oil at a level of from 0.1 to 2% by weight of the oil, such as from 0.2 to 0.8% by weight. Typically, the adsorbent is added to the oil, more preferably with stirring.

Preferably, the adsorbent is contacted with the oil at a temperature of from 70 to 100° C., such as 80 to 90° C.

The adsorbent is preferably contacted with the oil at a reduced pressure, such as a pressure of less than 500 mbar, more preferably less than 250 mbar, for example 10 to 200 mbar.

Most preferably, the adsorbent is contacted with the oil at a temperature of from 70 to 100° C., such as 80 to 90° C. and at a reduced pressure, such as a pressure of less than 500 mbar, more preferably less than 250 mbar, for example 10 to 200 mbar.

The adsorbent is preferably contacted with the oil for a time of from 5 minutes to 2 hours, more preferably from 10 minutes to 1 hour.

It has been found to be advantageous to treat the oil with the adsorbent in the presence of water. It is believed that the presence of water assists the removal of unwanted compounds, such as free fatty acids, from the oil, as well as allowing the oil to reach the desired pH range of from 6 to 8.

The pH is the pH of a water extract of the oil. The pH can be determined by AOCS Official Method G 7-56.

The amount of water that is used in the invention is not critical, provided that it is sufficient to achieve the pH of from 6 to 8. Typically, water is present in an amount of at least 0.10% by weight of the oil. Generally, the amount of water used in the invention will not exceed about 1% by weight of the oil.

Preferably, water is added to the oil, prior to contacting the oil with the natural adsorbent, in an amount of from 0.01 to 0.5% by weight of the oil, such as from 0.05 to 0.25% by weight of the oil, for example from 0.10 to 0.20% by weight of the oil. It will be appreciated, however, that the total water content may be higher than the amount of water that is added due to any water that is present in the oil and any water that is initially present in the adsorbent. Normally, the water will be dissolved and/or dispersed in the oil and/or associated with the adsorbent.

Separation of the oil is carried out by methods that will be known to those skilled in the art. For example, the adsorbent may be separated from the oil by filtration and this is preferred, particularly when the adsorbent is added to the oil. A filter of less than 5 microns, such as a 1 micron filter, is suitably used. Alternatively, the oil may be passed through a column or otherwise brought into contact with a body of the adsorbent and so may be separated simply by flowing out of the column or passing through or over the body of adsorbent.

Typically, the oil is dried during treatment with the adsorbent (for example by carrying out the contacting step at a reduced pressure below atmospheric pressure) and/or after being separated from the adsorbent.

Preferably, the treated oil is dried before or after being separated from the adsorbent. Drying may be carried out by methods that are well known to those skilled in the art. Preferably, the oil is dried under vacuum at a pressure of less than 500 mbar, such as from 1 to 200 mbar.

The invention has the advantage that the pH of the oil can be adjusted without the addition of a base that would form soaps (i.e., salts of fatty acids) from the glycerides in the oil. Preferably, the treated oil comprises less than 1% by weight of soaps, such as less than 0.8%, even more preferably less than 0.5%, such as less than 0.1% of soaps by weight of the oil. Soaps have an adverse effect on the taste of the oil and downstream products.

Treatment of the vegetable oil is preferably a pretreatment. The term "pretreatment" is well-known to those skilled in the art. Pretreatment is typically a treatment of the oil that takes place before further industrial processing, such as by chemical conversion. The pretreatment is preferably a purification of the oil prior to an enzyme-catalysed interesterification.

The oil that is treated according to the method of the invention is preferably used in the process of the invention for interesterifying a vegetable oil, which comprises treating the vegetable oil according to the method of the invention and reacting the vegetable oil in the presence of an enzymatic catalyst for interesterification.

The enzymatic catalyst is preferably a lipase. The lipase may be selective, for example for the 1 and 3 positions on the triglyceride, or it may have no selectivity between the 1, 2 and 3 positions of the triglyceride.

The lipase causes the fatty acid residues on the triglyceride to be more evenly distributed between the 1 and 3 (if it is selective for those positions) or the 1, 2 and 3 positions of the triglyceride. Preferably, the fatty acid residues are randomised during the interesterification reaction.

Lipases are commercially available. The most preferred lipase for use in the invention is a lipase from *Thermomyces lanuginosus*.

Preferably, the enzymatic catalyst is immobilised on a support.

A suitable lipase from *Thermomyces lanuginosus* immobilised on a support is available as Lipozyme TL IM from Novozymes A/S (Denmark).

It has been found that treatment of the oil according to the invention can increase the productivity of the catalyst in the interesterification reaction. Preferably, the productivity of the catalyst in the interesterification reaction is at least 1500 kg of oil per kg of catalyst, more preferably at least 1700 kg of oil per kg of catalyst, such as from 1800 to 2500 kg of oil per kg of catalyst.

The interesterification reaction may be carried out by methods that will be known to those skilled in the art. For example, the reaction may be conducted using a continuous process by, for example, passing the treated oil through a packed column containing the enzymatic catalyst. In a preferred embodiment, the oil is pumped through the column with a flow-rate of from 1 to 10 kg oil/kg enzyme/hr.

The interesterification reaction is preferably conducted at a temperature above 30° C., such as from 40 to 90° C. Preferably, the interesterification reaction is conducted at a temperature of from 60 to 80° C., such as about 70° C.

The product of the interesterification reaction may be used to produce a hardstock for a margarine or spread. Preferably, the hardstock is produced by fractionating the interesterified oil.

The hardstock itself is typically obtained from the product of the interesterification reaction as a stearin (i.e., higher melting fraction) that is produced by fractionation. Fractionation can be solvent fraction or dry fractionation. Dry fractionation is preferred.

The hardstock preferably comprises less than 15%, more preferably less than 10% unsaturated fatty acids based on the weight of total fatty acid residues.

A margarine fat blend is produced from the hardstock for use in the margarine or spread. The fat blend preferably comprises 80 to 95% by weight liquid oil and 5 to 20% by weight of the hardstock. Preferred liquid oils are low erucic acid rapeseed oil, soybean oil, sunflower oil, safflower oil, linseed oil, high oleic acid residue containing varieties of such oils, groundnut oil, olive oil, and mixtures thereof.

The margarine or spread is produced from the fat blend and comprises an aqueous phase and an oil phase consisting of the present margarine fat blend. The oil phase may comprise, in addition to the margarine fat blend, additives that are commonly used in such products, such as, for example, emulsifiers, flavours, colorants and vitamins. Similarly the aqueous phase may comprise, apart from water, milk ingredients, flavour, preservatives, structuring and gelling agents, for example. The margarine or spread preferably comprises 10 to 85% by weight oil phase and 90 to 15% by weight aqueous phase.

The following non-limiting examples illustrate the invention and do not limit its scope in any way. In the examples and throughout this specification, all percentages, parts and ratios are by weight unless indicated otherwise.

EXAMPLES

In the examples, reference is made to the attached drawing in which:

FIG. 1 shows the experimental set-up for carrying out the process of Example 1.

Example 1

Pre-Treatment

Hard palm fraction (palm oil stearin—POs) is blended with palm kernel oil (PK) and the oil blend is heated to 80-90° C. After this, 0.15% (by wt of the oil blend) demineralised water is added and the obtained mixture is stirred at an average speed and atmospheric pressure for 15 minutes. After this, 0.5% (by wt of the oil blend) of natural bleaching earth is added and the mixture is stirred for an additional 40 minutes at average speed and a reduced pressure of 100 mbar.

After this, the vacuum is released and the oil blend is filtered through a 1 μm filter.

Enzymatic Interesterification

Enzymatic interesterification is conducted using a continuous process (see FIG. 1) in which the feed stock is pumped through a packed column containing enzyme Lipozyme TL IM. The temperature of the feed stock and the packed bed reactor is set at 70° C. After this, the oil is pumped from tank 1 via line 4 through the column 2 with a flow-rate of 4 kg oil/kg enzyme/hr. The interesterified product exits the column via line 5 and is collected in a sample collector 3. The reaction progress is monitored by taking samples at regular time intervals and measuring the carbon number of the composition. The conversion is calculated based on these carbon numbers (see below).

Calculation of Conversion and Activity

When the POs/PK blend is interesterified, the following equation is used to calculate the conversion:

$$X = \frac{[C44 + C46]_{t=t} - [C44 + C46]_{t=0}}{[C44 + C46]_{eq} - [C44 + C46]_{t=0}}$$

The activity (k) is calculated by using the following equation (where F=flow and W=weight):

$$Act = -Ln(1 - X) * \frac{F}{W}$$

When Ln k is plotted against time, a linear correlation is obtained. Rate of deactivation can be obtained by the slope of this linear correlation:

$$Lnk = Lnk_0 - k_d * t \Rightarrow Ln\left(\frac{k}{k_0}\right) = -k_d * t \Rightarrow t_{1/2} = -\frac{Ln2}{k_d}$$

The productivity is calculated using the following equation (at $t=2.5*t_{1/2}$):

$$\text{Productivity} = \frac{k_0 * [e^{-k_d * t} - 1]}{k_d * \ln[1 - X]}$$

Examples 2 to 4

Comparative

Example 2

Example 1 was repeated but the feed stock was not pre-treated with bleaching earth.

Example 3

Comparative

Example 1 was repeated but the feed stock was pre-treated with an acid-activated (i.e, non-natural) bleaching earth.

Example 4

Comparative

Example 1 was repeated but the feed stock was pre-treated with silica.

Examples 1 to 4

Results

The following results were obtained for the effect of the pretreatment on the performance of the lipase:

|           | In k at 240 hours | In k at 600 hours |
|-----------|-------------------|-------------------|
| Example 1 | 1.8               | 0.9               |
| Example 2 | 1.5               | 0                 |
| Example 3 | 1.5               | 0                 |
| Example 4 | 1.4               | 0                 |

Example 1 was the best pretreatment for prolonging the performance of the lipase, having the highest enzyme activity after 240 hours reaction and retaining activity at 600 hours.

The invention claimed is:

1. A process for interesterifying a vegetable oil, which comprises treating the vegetable oil by contacting the vegetable oil with a natural adsorbent to give a pH in the range of from 6 to 8, separating the oil from the adsorbent and reacting the treated oil in the presence of an enzymatic catalyst for interesterification, wherein the natural adsorbent is a natural bleaching earth.

2. Process as claimed in claim 1, wherein the oil is contacted with the adsorbent in the presence of water.

3. Process as claimed in claim 2, wherein water is added to the oil before the contacting step in an amount of from 0.01 to 0.5% by weight of the oil.

4. Process as claimed in claim 3, wherein the oil is dried during treatment with the adsorbent and/or after being separated from the adsorbent.

5. Process as claimed in claim 4, wherein the treated oil comprises less than 1% by weight of soaps.

6. Process as claimed in claim 5, wherein the enzymatic catalyst is immobilised on a support.

7. Process as claimed in claim 6, wherein the enzymatic catalyst is a lipase.

8. Process as claimed in claim 7, wherein the enzymatic catalyst is a lipase from *Thermomyces lanuginosus*.

9. Process as claimed in claim 8, wherein the oil comprises one or more oil(s) derived from palm.

10. Process as claimed in claim 9, wherein the oil comprises palm oil stearin and palm kernel oil.

11. Process as claimed in claim 10, wherein the productivity of the catalyst is at least 1500 kg of oil per kg of catalyst.

12. A method of increasing the productivity of an enzyme in a process for the interesterification of a vegetable oil, which comprises treating the oil with a natural adsorbent to give a pH in the range of from 6 to 8.

13. Method as claimed in claim 12, wherein the oil is treated in the presence of water.

14. A method of producing a hardstock for a margarine, which comprises interesterifying a vegetable oil according to the process of claim 1.

\* \* \* \* \*